United States Patent
Groom et al.

(10) Patent No.: US 6,583,610 B2
(45) Date of Patent: Jun. 24, 2003

(54) VIRTUAL RIPPLE GENERATION IN SWITCH-MODE POWER SUPPLIES

(75) Inventors: Terry J. Groom, Durham, NC (US); Stuart Pullen, Raleigh, NC (US)

(73) Assignee: Semtech Corporation, Morrisville, NC (US)

( * ) Notice: Subject to any disclaimer, the term of this patent is extended or adjusted under 35 U.S.C. 154(b) by 41 days.

(21) Appl. No.: 09/804,364

(22) Filed: Mar. 12, 2001

(65) Prior Publication Data

US 2002/0125872 A1 Sep. 12, 2002

(51) Int. Cl.[7] .................................................. G05F 1/40
(52) U.S. Cl. ........................ 323/288; 323/224; 323/225; 323/271
(58) Field of Search .............................. 323/224, 225, 323/282, 283, 284, 288, 271, 222

(56) References Cited

U.S. PATENT DOCUMENTS 5,479,090 A * 12/1995 Schultz ........................ 323/284
6,229,293 B1 * 5/2001 Farrenkopf .................. 323/222
6,396,252 B1 * 5/2002 Culpepper et al. .......... 323/285
6,465,993 B1 * 10/2002 Clarkin et al. ............... 323/272

* cited by examiner

*Primary Examiner*—Michael Sherry
*Assistant Examiner*—Gary L. Laxton
(74) *Attorney, Agent, or Firm*—Coats & Bennett, P.L.L.C.

(57) ABSTRACT

A system and method provides virtual ripple signal generation for use in voltage regulation applications. Some switch-mode power converters or voltage regulators use output signal ripple to effect voltage regulation. A virtual ripple generator provides this type of voltage regulator with a virtual ripple signal comprising an offset component responsive to actual load voltage, but with a generated AC ripple component of arbitrary magnitude that is independent of actual output signal ripple. Unlike the actual output ripple signal, the generated AC ripple component is not dependent on implementation specifics, such as circuit board layout or output capacitor ESR, and may have its gain set independent of the offset component. The generated AC ripple component is synchronized to the inductor switching actions of the voltage regulator and thus reflects actual inductor phase switching in single and multi-phase regulation applications. Virtual ripple signal generation can include output (load) voltage droop compensation.

66 Claims, 11 Drawing Sheets

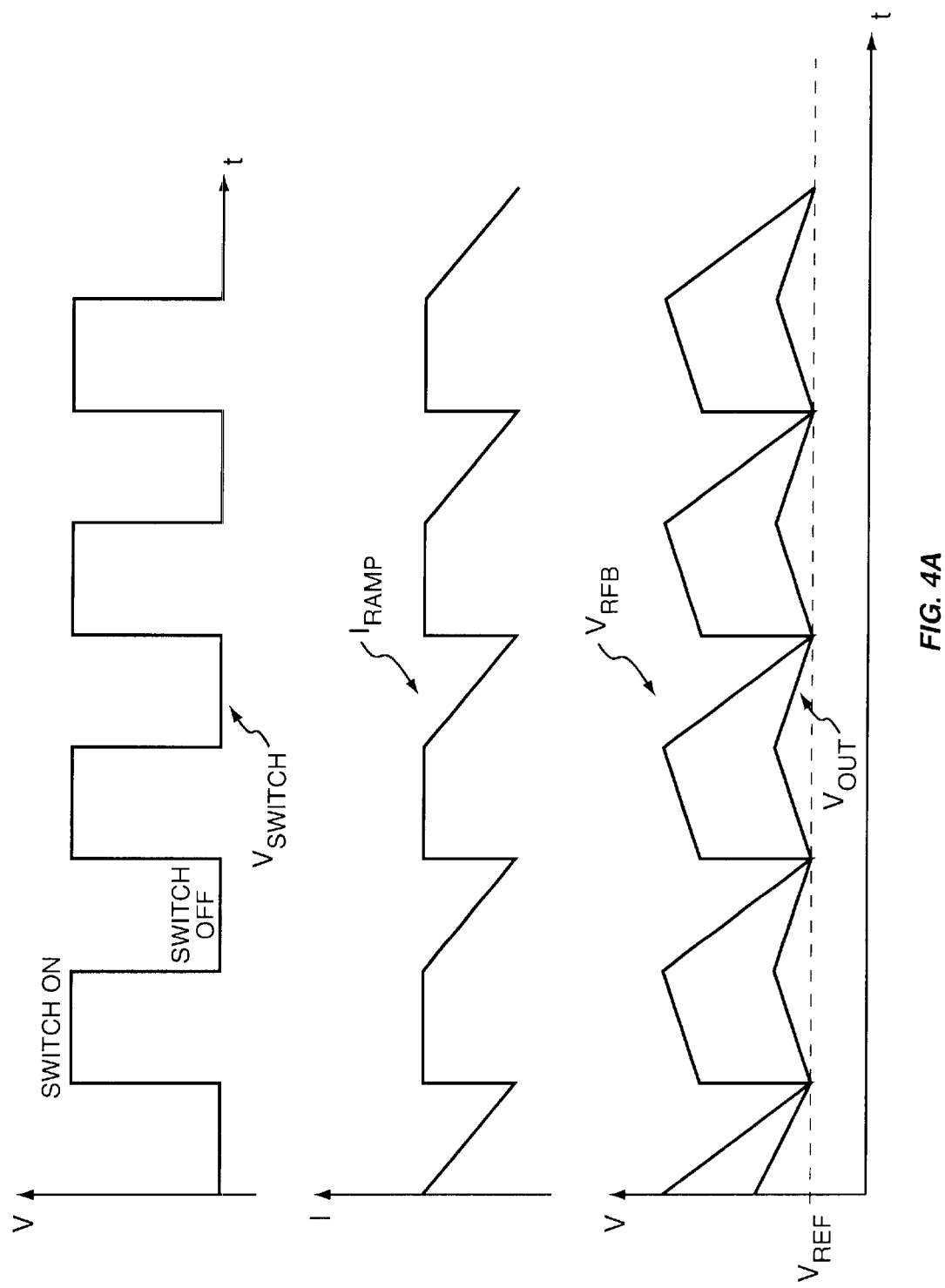

VIRTUAL RIPPLE GENERATION IN SWITCH-MODE POWER SUPPLIES

BACKGROUND OF THE INVENTION

The present invention relates to power supply regulation, and particularly relates to power converters employing ripple-mode regulation.

Advances in one area of technology often require commensurate advances in supporting technologies to realize the full benefit of the advance. For example, observers of the microprocessor industry are familiar with "Moore's Law," which posits that the complexity of semiconductor devices doubles every two years. Microprocessor development arguably represents the most dramatic illustration of Moore's Law. Pioneering microprocessors released in the 1970's operated at clock speeds well under 500 KHz, and included fewer than five thousand transistors. Modern microprocessors operate at clock speeds in excess of 1 GHz and include millions of transistors. Exploiting these dramatic gains required advances in a host of supporting technologies, from advances in memory technology and circuit fabrication, to advances in power supply design.

Indeed, modern microprocessors could not provide their dramatic performance gains absent today's sophisticated power supplies. For example, high-end microprocessors can consume in excess of 80 Watts of power and operate at 2 VDC or less. These requirements translate into power supply output current requirements in excess of 40 Amps, yet the power supply must maintain tight output voltage regulation, even when faced with dramatic step changes in output current. In general, modern electronic systems require responsive power supplies capable of providing relatively clean power at well-controlled voltages, over a wide range of quickly changing load conditions.

Linear regulators are responsive, accurate, and essentially noiseless. Such regulators operate using controlled impedance, typically implemented as a pass transistor, to create a voltage drop across the controlled impedance such that the input voltage minus the drop equals the desired output voltage. With proper use of load capacitors, linear regulators offer good line and load regulation performance, with virtually no noise problems. However, linear regulators are inefficient when required to regulate to an output voltage significantly below their input voltage. Because of the high currents required by modern electronic systems, main power supplies often operate at 12 VDC or 24 VDC. Regulating such primary voltages down to 2 VDC, or even 5 VDC, for high-current loads is impractical using linear regulation.

Switch-mode power supplies offer significant efficiency advantages compared to linear regulation, and avoid most of the power dissipation problems associated with linear regulators. Switch-mode power supplies operate, as their name suggests, by switching some type of reactive element in and out of a supply path to effect output voltage control. The reactive elements may be one or more capacitors, such as in a charge-pump type switcher. However, inductor-based switch-mode power supplies are more common in high-current, high-performance power supply applications. Typically, an inductor is switch-connected to a voltage source at one end, and to an output load at the other end. An output capacitor sits in parallel with the output load. A switch controller rapidly connects and disconnects the inductor to the voltage supply to regulate the load voltage. The output capacitor serves as a low-impedance current source to the load, and helps smooth the output voltage of the power supply.

The switch controller in a switch-mode power supply requires some form of feedback to effect closed loop voltage regulation on the load. Many different regulation topologies exist, including voltage-mode feedback and current-mode feedback. In both voltage-mode and current mode feedback, an error amplifier typically generates a control signal by amplifying a difference between a feedback signal and a reference signal. This error amplification can reduce the bandwidth of the feedback loop, diminishing the switch controller's ability to respond to highly dynamic load changes, as are common with microprocessors and other high-performance electronic circuits.

Ripple-mode regulators offer greater responsiveness to load dynamics by employing a high-speed, comparator-based feedback loop. As the name implies, ripple-mode regulators regulate their output voltage based on the ripple component in the output signal. Because of their switching action, all switch-mode regulators generate an output ripple current through the switched output inductor, or inductors in a multiphase regulator. This current ripple manifests itself as an output voltage ripple due, principally, to the equivalent series resistance (ESR) in the output capacitors placed in parallel with the load. Of course, printed circuit board (PCB) trace resistance and other effects contribute to output voltage ripple.

Hysteretic controllers and constant on-time controllers are two examples of ripple-mode voltage regulators. A hysteretic controller uses a comparator to compare the output voltage being regulated, including ripple, to a hysteresis control band. Above an upper hysteresis limit, the hysteretic controller switches its associated output inductor(s) low, and below a lower hysteresis limit the hysteretic controller switches the output inductor(s) high. Constant on-time controllers operate similar to hysteretic controllers, but typically switch their output inductor(s) high for a fixed time when the output ripple falls below a single reference point.

While output ripple is useful in output voltage regulation, it is undesirable in terms of output signal noise and load voltage limits. Indeed, the desire to minimize output ripple has lead capacitor manufacturers to find new ways to reduce capacitor ESR, a chief cause of output ripple. Lowering output capacitor ESR can significantly lower the output ripple signal. Low ripple serves the interests of noise minimization and reduced load voltage variation, but makes ripple-mode regulation more challenging. Below a certain magnitude, the ripple signal becomes problematic because of noise issues and reduced comparator voltage differentials.

SUMMARY OF THE INVENTION

A virtual ripple generator provides a regulator feedback signal that includes a generated ripple component of arbitrary magnitude. The generated ripple component is synchronized to the inductor switching actions of a switched-mode voltage regulator that uses the regulator feedback signal for output voltage regulation. The virtual ripple generator forms the regulator feedback signal by combining an output feedback signal with the generated ripple component. The output feedback signal reflects the actual regulator output signal, taken at the load for example. While this output feedback signal may include whatever actual output ripple is present in the regulator's output signal, the generated virtual ripple component is independent from actual output ripple. Similarly, any DC gain applied to the output feedback signal is independent from virtual ripple gain. The voltage regulator bases steady-state regulation on ripple in the regulator feedback signal, which includes generated ripple and actual ESR-induced output ripple. However, the voltage regulator remains responsive to transient changes in output loading, as reflected by sudden changes in the magnitude of the output feedback component of the regulator feedback signal.

The virtual ripple generator includes one or more ramp generators synchronized with the inductor switching operations of the associated voltage regulator. Nominally, the virtual ripple generator includes a ramp generator for each regulator output phase, with each ramp generator synchronized to the switching of its corresponding regulator output phase. Thus, the virtual ripple generator offers straightforward scaling for use with multiphase voltage regulators. However, the number of ramp generators and the synchronization details may vary as needed in both single- and multi-phase regulator applications. In both single, and multiphase regulation applications, the regulator has the advantage of basing phase switching on generated ripple components, rather than relying on noise-prone actual output ripple. In multiphase applications in particular, this benefit allows the regulator to maintain precise switching phase relationships between its output phases.

The virtual ripple generator can be implemented as a stand-alone circuit, or integrated into a voltage regulator. Depending upon the particular application, operating characteristics of the virtual ripple generator, such as virtual ripple magnitude, may be fixed or adjustable. Further, the virtual ripple generator may incorporate enhancements such as droop compensation. With droop compensation, the output feedback signal is adjusted in proportion to voltage regulator output current, making an offset of the regulator feedback signal provided by the virtual ripple generator responsive to output load current. This allows the voltage regulator to implement output voltage droop under high load current conditions, which can prevent undesirable voltage overshoots from occurring when the high-current conditions is suddenly relieved.

BRIEF DESCRIPTION OF THE DRAWINGS

FIGS. 4A and 4B are diagrams of several signal waveforms relating to operation of the voltage regulator of FIG. 2, and in particular to the operation of the virtual ripple generator.

DETAILED DESCRIPTION OF THE INVENTION

Figure 1A:
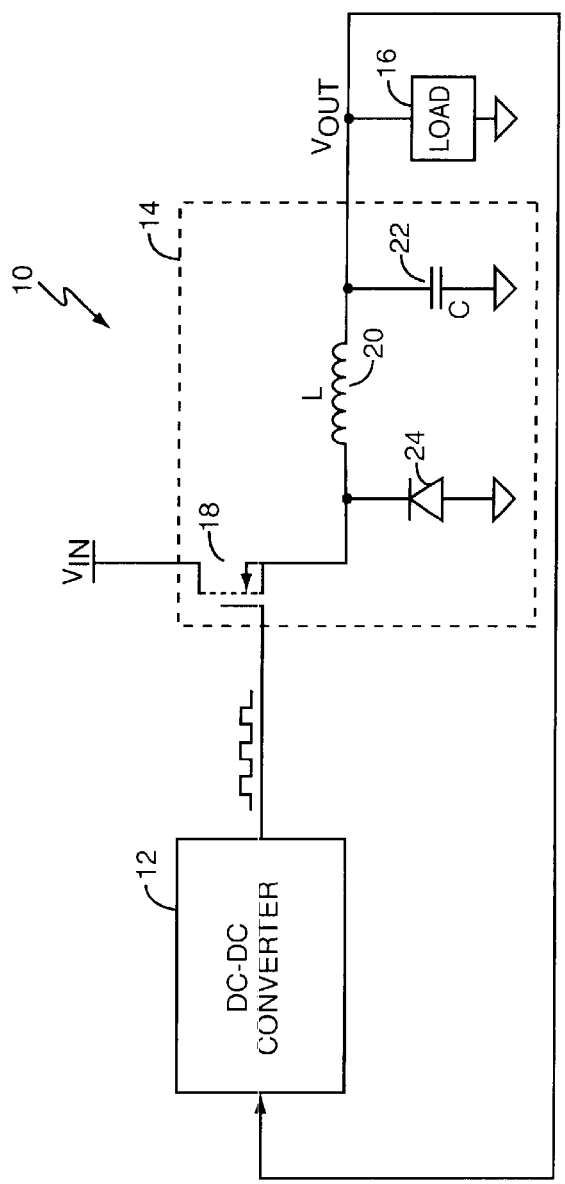
FIG. 1A is a diagram of a typical voltage regulator operating in ripple-mode regulation.

FIG. 1 depicts a typical electrical system 10, and includes a DC-DC converter 12 driving a single-phase output circuit 14, which in turn provides a regulated output voltage to a load 16. The output circuit 14 includes a switch 18, an output inductor 20, an output capacitor 22, and a circulating diode 24. Those skilled in the art will recognize the basic topology of the converter 12 and associated output circuit 14 as a single-phase "buck" converter configuration. The supply voltage $V_{IN}$ is at a higher potential than the desired value of $V_{OUT}$ used to power the load 16. The converter 12 turns switch 18 on and off, connecting and disconnecting the inductor 20 from the supply voltage $V_{IN}$ and thereby generating $V_{OUT}$ at the desired potential. $V_{OUT}$, or some signal proportional to $V_{OUT}$, is fed back to the converter 12 so that it regulates $V_{OUT}$ to the desired potential. In a buck configuration, $V_{OUT}$ is at a lower potential than $V_{IN}$. Because the basic operation of inductor-based, switch-mode converters is well understood by those skilled in the art, detailed aspects of operation for the converter 12 are not presented.

One characteristic of virtually all switch-mode converters is that they generate some amount of ripple in the regulated output voltage $V_{OUT}$ due to switching the inductor 20 on and off. Many factors influence the magnitude of this ripple, with the equivalent series resistance (ESR) of the output capacitor 22 being a dominant factor. Current in the inductor 20 ramps up when it is switched into connection with the supply voltage $V_{IN}$. Conversely, the current in the inductor ramps down when it is disconnected from $V_{IN}$. This ramping up and down of the inductor current causes a ripple in the output voltage $V_{OUT}$ due to the ESR of the output capacitor 22.

Figure 1B:
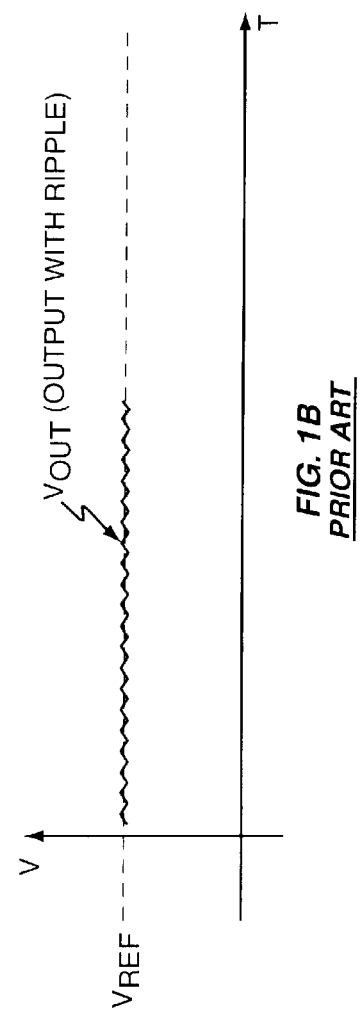
FIG. 1B is a diagram of output signal ripple for the voltage regulator of FIG. 1.

FIG. 1B illustrates a typical output voltage $V_{OUT}$, as generated by the typical converter 12. A reference voltage, $V_{REF}$, represents the desired output voltage, or some fraction thereof. By comparing $V_{OUT}$ with $V_{REF}$, the converter 12 controls switching of the switch 18 to maintain $V_{OUT}$ at the desired value. $V_{OUT}$ is shown in steady-state conditions and represents a DC offset that is nominally equal to $V_{REF}$, or the desired regulation voltage, with some amount of output ripple impressed onto it. Broad classes of converters 12, so-called "ripple mode" regulators, use this output ripple to effect switching control for load voltage regulation. Because the magnitude of the ripple in $V_{OUT}$ depends on changing load conditions, switching frequencies, PCB layout, and a host of other factors, basing regulation control on output ripple can be problematic. Moreover, practical issues, such as the tendency for the $V_{OUT}$ feedback signal to pick up noise, further complicate using actual output ripple as a controlling signal for voltage regulation.

Figure 2:
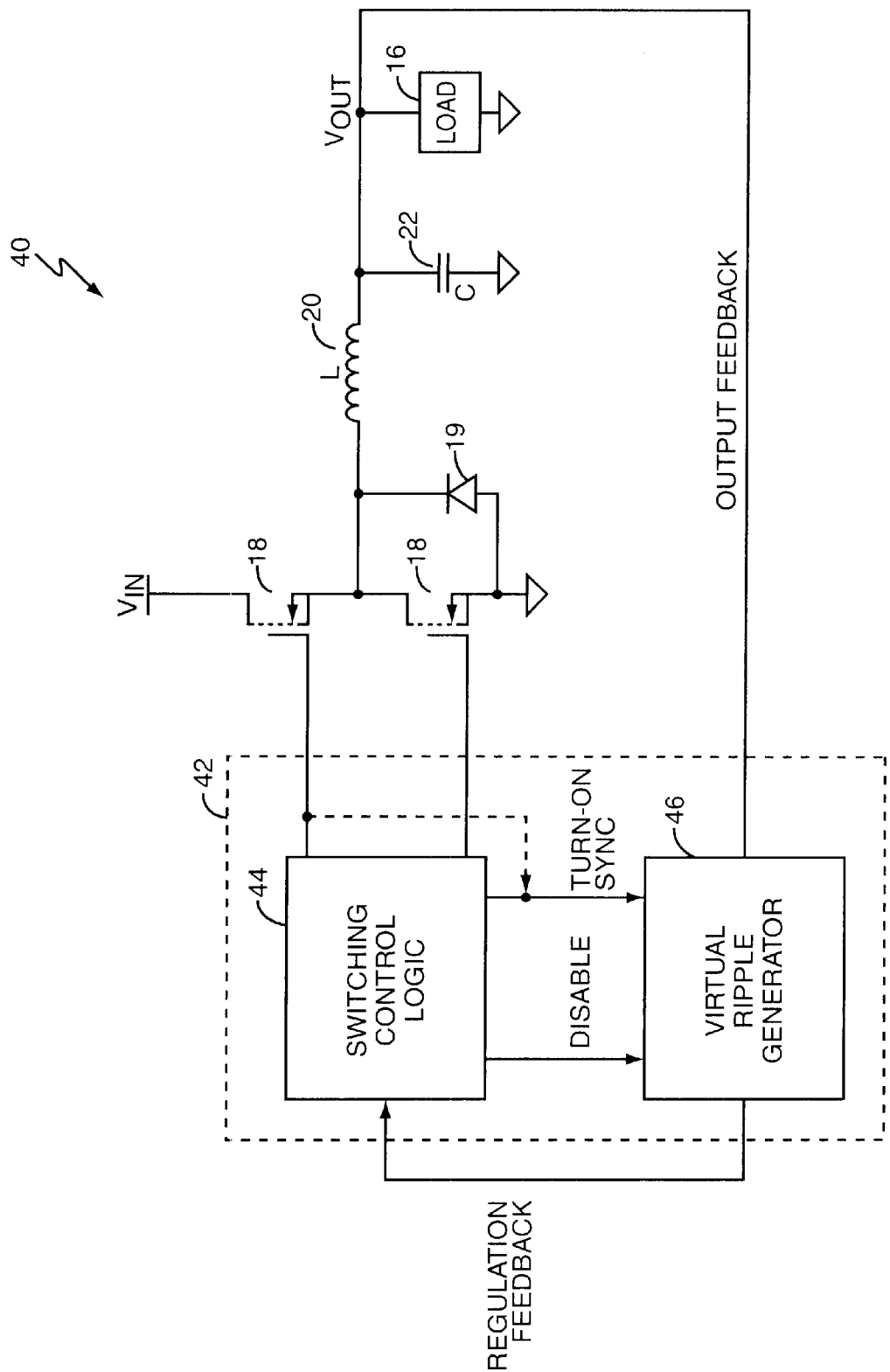
FIG. 2 is a diagram of a voltage regulator operating in ripple-mode regulation and including a virtual ripple generator.

FIG. 2 illustrates an electrical system 40 in accordance with the present invention. A DC-DC converter 42 functions as a switch-mode power supply providing voltage regulation for the load 16 by controlling the output switches 18. The switches 18 may, for example, be field-effect transistors (FETs). There may or may not be a diode 19 in parallel with the low side switch 18 (the lower switch 18). The diode 19 may be integral to the FET 18 (i.e., body diode). It should be understood that FIG. 2 illustrates a "synchronous buck converter" topology for the purposes of discussion. The invention contemplates use with a broad range of converter topologies, including single and multi-phase buck (step-down) and boost (step-up) configurations.

The converter 42 includes switching control logic 44 and a virtual ripple generator 46, but the invention contemplates discrete implementation of one or more functional portions of the converter 42. For example, the virtual ripple generator 46 could be implemented separately from the integrated circuit containing the switching control logic 44. The switching control logic 44 controls switching of the output switches 18 in accordance with a regulation feedback signal provided by the virtual ripple generator 46.

In operation, an output feedback signal is taken from the load side of the inductor 20. Generally, this output is taken at or near the connection of the load 16. In steady state operation the output feedback signal comprises an offset representing the DC value of the output voltage $V_{OUT}$, and a ripple component arising from the switched inductor current operating on the ESR of the capacitor 22, and various other impedance effects. During transient conditions, such as when the current drawn by the load 16 dramatically changes, the output feedback signal directly reflects such changes in both its offset and ripple component.

The virtual ripple generator 46 provides the switching control logic 44 with a regulation feedback signal responsive to actual output conditions at the load 16, but with an artificially generated ripple component that may be reliably used for regulation control. In at least some embodiments, the virtual ripple generator 46 buffers the regulated output signal to create a first component of the regulation feedback signal, and then impresses a desired ripple in the regulation feedback signal. In this manner, the virtual ripple generator 46 creates the regulation feedback signal as a composite signal. The composite signal comprises a buffered, or buffered and scaled version of the actual output signal, and a ripple signal synchronized to switching cycles of the converter 42. Thus, the regulation feedback signal reflects the DC value of the output signal and is responsive to transient changes in the output signal level, but has a virtual ramp that may be made arbitrarily large. With the virtual ramp component in the regulation feedback signal, ripple-mode regulation is improved.

Figure 3:
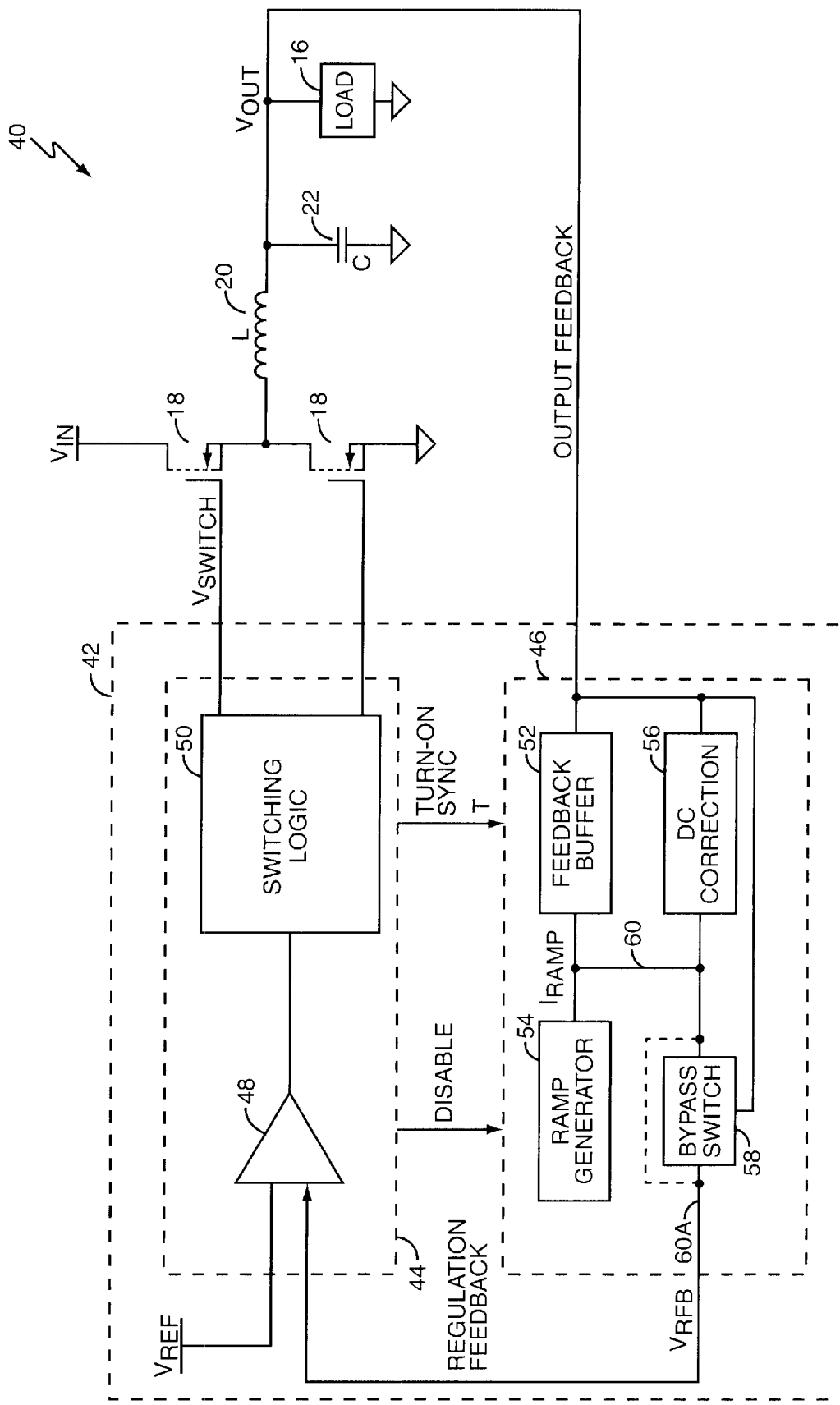
FIG. 3 is a more detailed diagram of the voltage regulator of FIG. 2.

FIG. 3 illustrates the converter 42 in more detail. Note that converter 42 is also referred to as voltage regulator 42 within the specification to emphasize its functionality as a voltage-regulating device for the load 16. Switching control logic 44 includes a regulation comparator 48 and switching logic 50. The regulation comparator 48 compares the regulation feedback signal to a reference voltage $V_{REF}$. Nominally, the output voltage $V_{OUT}$ is equal to the reference voltage $V_{REF}$. Thus, the regulation feedback signal is nominally at the same level as $V_{REF}$. The ripple component in the regulation feedback signal causes $V_{OUT}$ to move just above and just below the reference voltage $V_{REF}$, as the converter 42 switches the output circuit 14 in and out of connection with the supply voltage. In this manner, the regulation comparator 48 "clocks" the switching logic 50 based on the ripple in the regulation feedback signal. The switching logic 50 generates switching pulses suitable for turning the switch 18 on and off in response to the clocking signal output by the regulation comparator 48.

The virtual ripple generator 46 includes a feedback buffer 52, a ramp generator 54, a DC correction circuit 56, and, optionally, a bypass switch 58. The feedback buffer 52, the ramp generator 54, and the DC correction circuit 56 all share a common output node 60 which carries the regulation feedback signal that is fed to the regulation comparator 48, either through the bypass switch 58 via node 60A or, if the switch is omitted, directly. In other configurations or implementations of the virtual ripple generator, the feedback buffer 52, the ramp generator 54, and DC correction circuit 56 may or may not share a common node. In one embodiment of the virtual ripple generator 46, feedback buffer 52 is configured as a voltage follower, providing a buffered version of the output feedback signal to the output node 60 (or node 60A if the bypass switch 58 is present).

Ramp generator 54 produces a ramping signal with defined ramp characteristics for use in impressing or creating a desired ripple component in the regulation feedback signal. In some implementations, the output feedback signal may be taken from a point other than at the load 16.

The ramp generator 54 generates a ramp current that is synchronized to the turn-on synchronization signal (RAMP START) from the switching control logic 44. The turn-on sync signal may be the actual output-switching signal of the switching logic 50 used to drive the high side switch 18 (the upper switch), or may be a derived signal synchronized to high side switching. The ramp generator 54 uses the turn-on sync signal to initiate ramp generation, which causes the ramp generator 54 to sink a ramping current, $I_{RAMP}$, from the output node 60. This sinking ramp current imparts the virtual ramp to the buffered version of the output feedback signal present on node 60.

The output feedback signal and the buffered version of the output feedback signal produced by feedback buffer 52 are nominally at the desired load voltage during steady state operation. Thus, sourcing $I_{RAMP}$ from the buffered version of the output signal tends to pull it below the nominal voltage level. The DC correction circuit 56 compensates for this "pull-down" effect by adding DC current into the output node 60 equal to the average $I_{RAMP}$ current generated by ramp generator 54. Absent this compensation, pulling down the buffered version of the output feedback signal below the nominal voltage level desired for the load 16 would cause an output voltage error at the load 16. The error would arise because the converter 42 would "see" an artificially depressed feedback voltage, which it would attempt to correct by raising the output voltage $V_{OUT}$ provided to the load 16 by an amount equal to the average offset introduced by the ramp generator 54.

In functional terms, the virtual ripple generator 46 creates a regulation feedback signal that is a combination of the actual output feedback signal taken from the load side of the inductor 20 and a desired ripple signal. The virtual ripple generator 46 may be used in both single phase and multiphase voltage regulator applications.

Figure 4B:
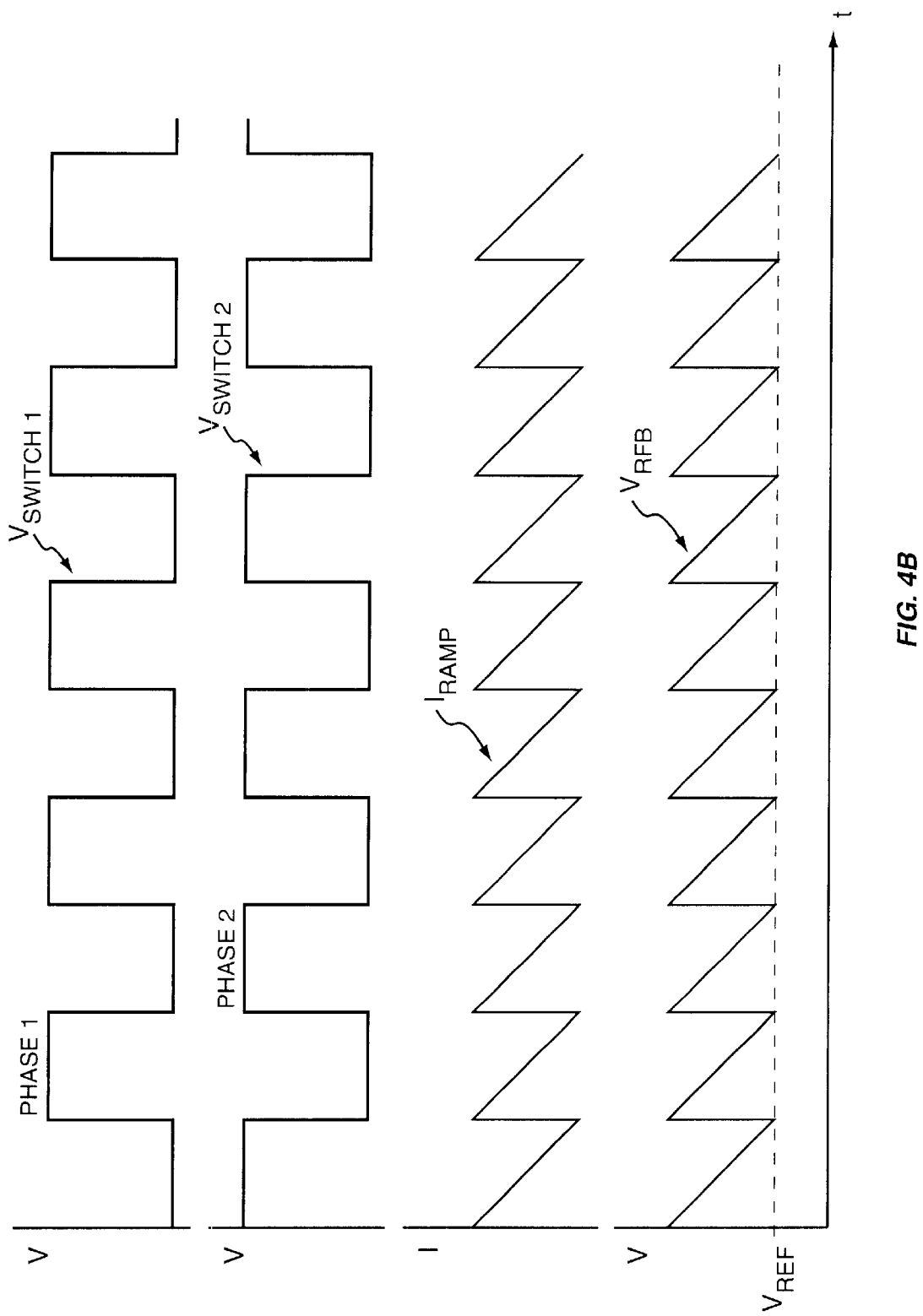
Figure 5:
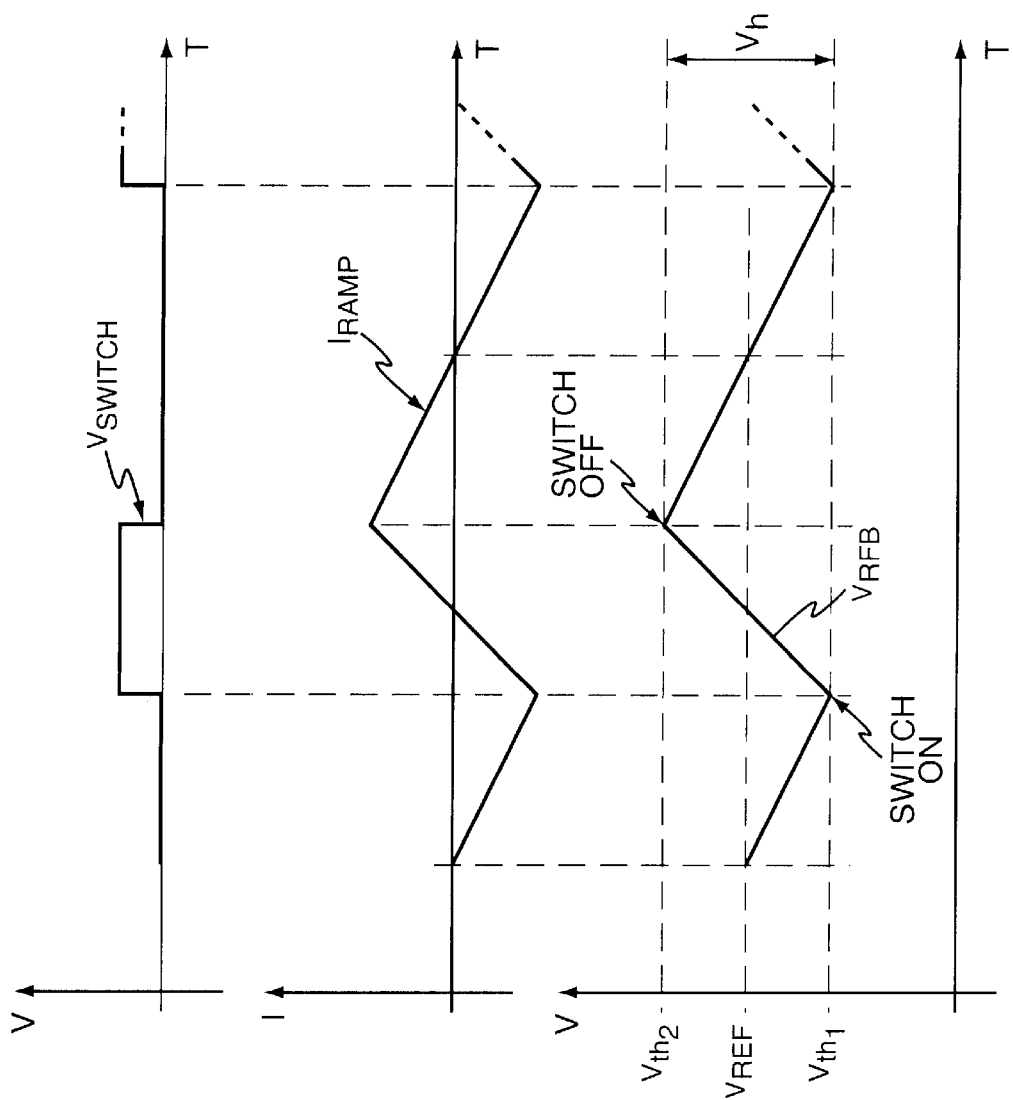
FIG. 5 is a diagram of virtual ripple generator signal waveforms that may be generated in an alternate embodiment of the virtual ripple generator of FIG. 2.

Operation in the single-phase case may be better understood in the context of FIGS. 4A, 4B, and 5. FIG. 4A relates to virtual ripple generation in a single-phase environment, while FIG. 4B illustrates dual-phase operation. FIG. 4A depicts three different time-aligned waveforms, not drawn to scale, but shown on the same time base.

The upper graph illustrates $V_{SWITCH}$ (see FIG. 3), which is the switching signal applied by the switching logic 50 to the high side (upper) output switch 18. When $V_{SWITCH}$ is asserted, the inductor 20 is connected to the supply voltage $V_{IN}$. Thus the positive pulses in the $V_{SWITCH}$ signal graph represent the turn-on pulses of the converter 42. The middle graph depicts the current ramp $I_{RAMP}$ generated by the ramp generator 54, and pulled from the output node 60 during operation of the virtual ripple generator 46. Note that the synchronization signal (RAMP START) provided by the switching control logic 44 to the virtual ripple generator 46 synchronizes the ramp generator 54 to the inductor switching operations of the switching control logic 44.

Specifically, RAMP START is asserted when the converter 42 turns on the high side switch 18, turning on the ramp generator 54. In some applications, there may be advantages, such as timing advantages, associated with starting $I_{RAMP}$ on the falling edge of RAMP START. Because $I_{RAMP}$ is pulled from the output node 60, the voltage of the regulation feedback signal ($V_{RFB}$) begins falling in proportion to $I_{RAMP}$, at the point where the high side switch 18 is turned off. The lower graph depicting $V_{RFB}$ illustrates the correlation between the $V_{RFB}$ signal and $I_{RAMP}$. Note that $V_{RFB}$ is offset above $V_{REF}$ (nominally, the desired output voltage for load 16) by the DC correction circuit 56, such that the sinking current pulls $V_{RFB}$ down towards $V_{REF}$. The regulation comparator 48 uses $V_{REF}$ as the comparison set point in this embodiment. Thus, at the point where $V_{RFB}$ is pulled down to the threshold established by $V_{REF}$, the regulation comparator 48 changes states, which causes switching logic 50 to again turn on the high side switch 18.

FIG. 4B depicts a similar set of waveforms, but does so in the context of a dual-phase implementation. The upper two waveforms depict phase 1 and phase 2 switching waveforms, used to control a phase 1 high-side switch 18 and a phase 2 high-side switch 18. Preferably, the switching logic 50 generates the phase 1 and phase two switching waveforms with 180° of phase separation. The middle waveform depicts the ramp signal $I_{RAMP}$. The ramp generator 54 generates the ramp signal $I_{RAMP}$ responsive to the switching signals of both phase 1 and phase 2. More particularly, in this example, the ramp generator 54 restarts $I_{RAMP}$ at the switch turn on point of the high side switches 18 used in both phases. The lower waveform depicts the regulator feedback signal VRFB, and illustrates the effect of the $I_{RAMP}$ signal on $V_{RFB}$.

As noted, by operation of the virtual ripple generator 46, the regulator feedback signal $V_{RFB}$ includes the arbitrary ripple component generated as a function of $I_{RAMP}$, as well as AC and DC components of the actual output signal $V_{OUT}$. This provides the converter 42 with a regulator feedback signal $V_{RFB}$ that is immediately responsive to dynamic changes in $V_{OUT}$, but with greater noise immunity regarding the ripple component used for steady-state regulation. In this sense, the virtual ripple generator 46 provides the converter 42 with substantial noise immunity improvement during steady-state operation, without sacrificing its speed of response as compared to conventional hysteretic or constant-on time converters that do not include the virtual ripple generator 46.

While the ripple component generated by $I_{RAMP}$ may be made arbitrarily large, it generally is scaled to the same order of magnitude of the expected actual ripple component of the $V_{OUT}$ signal arising from inductor current and output capacitor ESR. For example, actual ESR-based ripple on $V_{OUT}$ may typically fall within the range of 2 mV to 5 mV. In relation, the $I_{RAMP}$ signal may be configured to impart a generated ripple component to the $V_{RFB}$ signal having a value in the range of, for example, 20 mV to 30 mV.

While still relatively small, this generated ripple component provides significant noise margin compared to the actual ESR-based ripple in $V_{OUT}$, plus the generated ripple component does not depend on output ESR. The magnitude of the ripple component should be kept below an upper limit, so that the generated ramp component of $V_{RFB}$ does not "swamp" or override transient step changes in the DC component of $V_{RFB}$, which corresponds to the DC component of the actual output voltage $V_{OUT}$.

FIG. 5 is similar to FIGS. 4A and 4B in that it depicts $V_{RFB}$ as a function of $I_{RAMP}$. Where FIGS. 4A and 4B illustrated the regulation feedback signal $V_{RFB}$ in the context of a single set point comparison for the regulation comparator 48, FIG. 5 illustrates a regulation feedback signal compatible with dual set point comparison. Thus, where FIGS. 4A and 4B presents a regulation feedback signal compatible with, for example, a constant on-time regulator that operates with a single regulation comparator threshold, FIG. 5 depicts a regulation feedback signal $V_{RFB}$ that is compatible with hysteretic voltage controllers.

In a hysteretic controller, the regulation comparator 48 compares the regulation feedback signal to a lower threshold $V_{th1}$ and an upper threshold $V_{th2}$. The voltage comparison band is generally referred to as the hysteretic voltage $V_h$. When the converter 42 is configured as a hysteretic controller, the switching logic 50 will turn on the high side switch 18 when $V_{RFB}$ crosses the lower threshold $V_{th1}$, and will turn it off when $V_{RFB}$ passes through the upper threshold $V_{th2}$. The ripple generator 46 may be adjusted such that it produces a ripple waveform, current or voltage based, compatible with any type of ripple-mode regulation scheme.

The converter 42 may be implemented with power saving features, allowing it to operate in a discontinuous switching mode during periods when the load 16 draws very little current. Under such conditions, disabling the virtual ripple generator 46 allows the switching control logic 44 to intermittently switch the output switches 18 as needed for discontinuous operation. In these circumstances, inclusion of the switch 58 in the virtual ripple generator 46 allows the output feedback signal to bypass the virtual ripple generator 46, and connect directly to the regulation comparator 48. As will be shown, a disable signal provided by the switching control logic 44, or another external circuit (not shown), can be used to shut down the ramp generator 54 to further power savings.

Figure 6A:
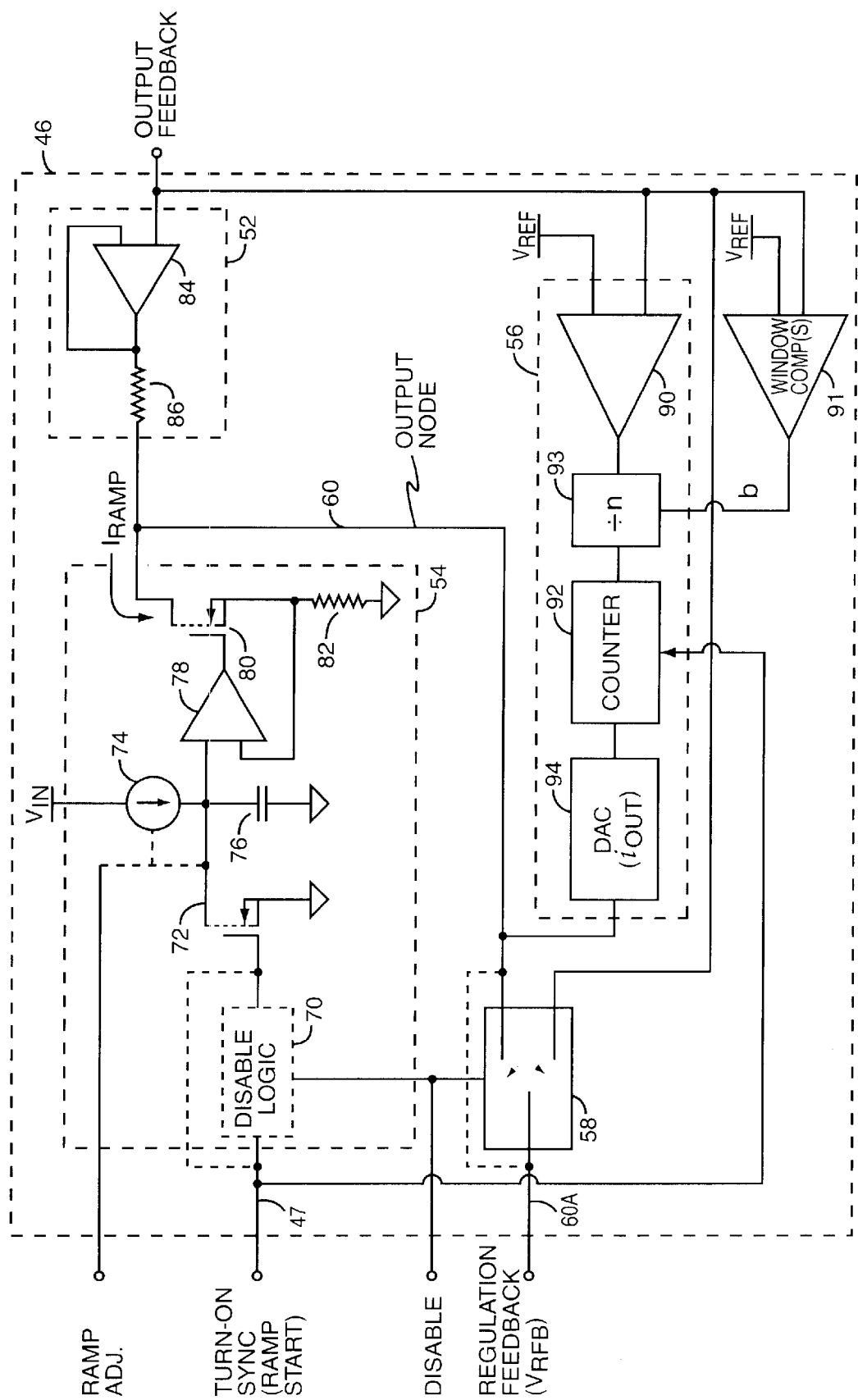
FIG. 6A is a more detailed diagram of the virtual ripple generator of FIG. 2.

FIG. 6A provides more detail regarding one implementation of the virtual ripple generator 46, and provides an opportunity to discuss its operation in more detail. The ramp generator 54 includes a synchronization input 47 (or inputs for multiple switching phases) adapted to receive a turn-on synchronization signal (RAMP START) so that it may synchronize its ramp generation with the actual output inductor switching operations of the switching control logic 44. Disable logic 70 is optionally included and prevents the synchronization signal from controlling a ramp enable switch 72 when the disable signal is asserted. When the disable logic is omitted, the synchronization or ramp start signal may directly control the ramp-enable switch 72. The synchronization signal controls the ramp-enable switch 72 to allow generation of $I_{RAMP}$ synchronized to the desired switching actions of the switching control logic 44.

In the embodiment illustrated, bringing the synchronization signal low turns off the ramp enable switch 72. This action causes a current source 74 to charge a ramp capacitor 76. The constant current output from current source 74 linearly charges the ramp capacitor 76. A feedback control amplifier 78 is configured to sink $I_{RAMP}$ from output node 60 in proportion to the ramp signal applied to its input by the charging of ramp capacitor 76. The amplifier 78 accomplishes this by controlling the gate voltage of FET 80 in response to a feedback signal taken from resistor 82, which generates a feedback voltage proportional to the value of $I_{RAMP}$.

Note that FIG. 6A includes a RAMP ADJ (ramp adjustment) control input not shown earlier. This feature may be included in the ramp generator 54 as a mechanism for permitting control of the $I_{RAMP}$ slope. Numerous techniques exist for ramp slope control. For example, RAMP ADJ might connect the current source 74 to a control resistor that sets the current magnitude in one configuration. Alternatively, the RAMP ADJ input might be connected to an external load capacitor that can be sized appropriately. In other implementations, the RAMP ADJ signal may be an analog voltage or current for proportional adjustment of the ramping characteristics.

The output feedback buffer 52 is shown as a voltage follower in this embodiment. In other embodiments, the feedback buffer 52 may apply a different gain to the output feedback signal, or may operate in a current-mode fashion. The output feedback signal is buffered through the buffer amplifier 84, the output of which is coupled to the output node 60 through a series impedance 86. Generally the series impedance 86 is implemented as a series resistor. With this configuration, the feedback buffer 52 provides the current for $I_{RAMP}$. Thus, the series resistor 86 causes a voltage drop between the output of the buffer amplifier 84 and the output node 60 proportionate to the value of $I_{RAMP}$ and the value of the series resistor 86. This proportionate voltage drop allows the ramp generator 54 to impress the desired ripple signal onto the buffered version of the output feedback signal measured at output node 60.

As explained earlier, during steady state operations the output feedback signal, or the buffered version of the output-back feedback signal provided by the output buffer 52, output node 60 is nominally at the desired regulated voltage. Thus, sinking $I_{RAMP}$ from the output node 60 has a tendency to pull the regulation feedback signal below the nominal output voltage. Because of the overall closed loop control imparted by the converter 42, this would have a tendency to cause the converter 42 to increase the regulated output voltage unless the regulation feedback signal is compensated. The DC correction circuit 56 accomplishes this by supplying current to the output node 60 proportional to the $I_{RAMP}$ waveform.

Because the offset effect that would otherwise arise from the tendency of $I_{RAMP}$ to pull the regulation feedback signal down is a steady state phenomenon, the DC correction circuit 56 is configured as a low bandwidth amplifier circuit. That is, the DC correction circuit 56 operates at a much lower frequency than the ramp generator 54, and compensates the regulation feedback signal $V_{RFB}$ for an average effect of the $I_{RAMP}$ waveform. Nominally, the compensation signal, a current in the illustrated embodiment, provided by the DC correction circuit 56 equals the DC average of the ramp current $I_{RAMP}$. However, this "target" value of the compensation signal may change depending upon the nature of the ripple signal produced by the ripple generator 54.

A digital implementation of the DC correction circuit 56 includes a comparator 90, one or more window comparators 91, a counter 92, a clock divider 93, and a digital-to-analog converter (DAC) 94. Alternatively, the DC correction circuit 56 may be implemented as an analog circuit. In this implementation, the "gain" of the DC correction circuit 56 changes based on the magnitude of the difference between $V_{REF}$ and the DC component of $V_{OUT}$. Effectively, the bandwidth of the DC correction circuit 56 increases with increasing error, and decreases with decreasing error.

The comparator 90 compares the output feedback signal with a reference voltage $V_{REF}$. As noted, $V_{REF}$ nominally has a value equal to the desired output voltage. The converter 42 may generate $V_{REF}$ internally, or an external circuit (not shown) may provide $V_{REF}$. The window comparator(s) 91 drive the clock divider 93 with a binary signal (e.g., b0, b1, b2, etc.) that selects the divider ratio applied to the comparison pulses output by the comparator 90. Typical divider ratios are divide-by-16, divide-by-4, and divide-by-1. The larger the divider ratio, the lower the bandwidth of the DC correction circuit 56.

If the binary signal from the window comparators 91 indicates a large error between $V_{REF}$ and $V_{OUT}$, greater than a 25 mV difference for example, the DC correction circuit 56 is set to its highest gain, based on the clock divider 93 adopting its divide-by-1 setting. This passes full-rate clocking into the counter 92, causing the count value into the DAC 94 to rapidly move toward the correct setting. As the compensation signal from the DAC 94 corrects the offset between $V_{OUT}$ and $V_{REF}$, the window comparators 91 reflect the decreasing error magnitude with changes in their binary outputs. In turn, this causes the clock divider 93 to adopt a greater divider ratio, divide-by-16 for example.

As noted, the counter 92 is configured to count the high/low state transitions output by the comparator 90, as pre-scaled by the clock divider 93. Counter 92 additionally includes a gating function that allows it to essentially latch the output of the clock divider 93 to avoid multiple transitions of the counter 92 per output switching cycle of the converter 42. This may be accomplished, for example, by using the turn-on synchronization (RAMP START) signal to latch or blank the input of the counter 92.

The DAC 94 operates as a current-mode output device, and thus provides the compensating signal as an output current proportional to the count value provided by the counter 92. Thus, whether the actual output feedback is above or below the reference voltage $V_{REF}$ determines whether the current output by the DAC 94 increases or decreases. Usage of the digital counter 92 with the clock divider 93 provides a convenient and flexible method for setting the bandwidth of the DC correction circuit 56 as a function the error magnitude. Once the error magnitude is sufficiently small, the clock divider 93 may use a relatively large divider value, thereby setting the control bandwidth to a very low value and imparting good stability of control. Thus, in operation, the DC correction circuit 56 provides a compensation signal to the output node 60 that prevents an undesirable voltage offset in the regulated output signal $V_{OUT}$ provided to the load 16.

Figure 6B:
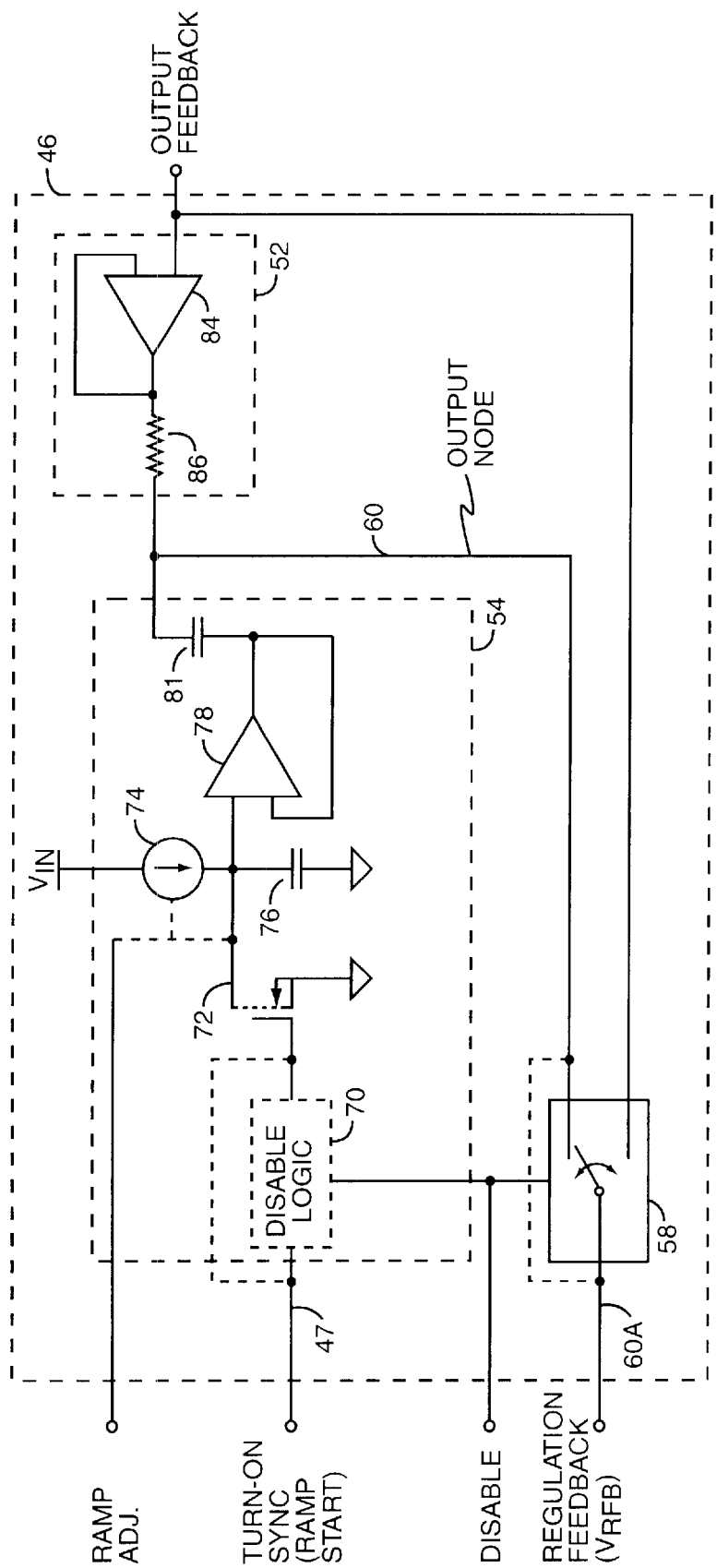
FIG. 6B is an alternate embodiment of the virtual ripple generator of FIG. 2.

FIG. 6B illustrates one variation on the virtual ripple generator 46 in which the DC correction circuit 56 is eliminated. The control amplifier 78 is implemented in a "follower" configuration, such that its output voltage signal follow the ramping voltage applied to its non-inverting input. The output from the amplifier 78 is coupled to the output node 60 through an AC coupling capacitor 81. The DC isolation between the buffered feedback signal generated by the output feedback buffer 52 and the ramp signal generated by the control amplifier 78 prevents the ramp generator 54 from introducing unwanted DC offset into the regulation feedback signal $V_{RFB}$. This circuit simplification comes at the expense of "tunability." The response with the simplified implementation is primarily fixed by the value of capacitor 81 and series resistor 86 in the output feedback buffer 52, whereas the digital implementation of the DC correction circuit 56 introduced in FIG. 6A provides an adaptive response that is a function of the offset error magnitude.

Figure 7:
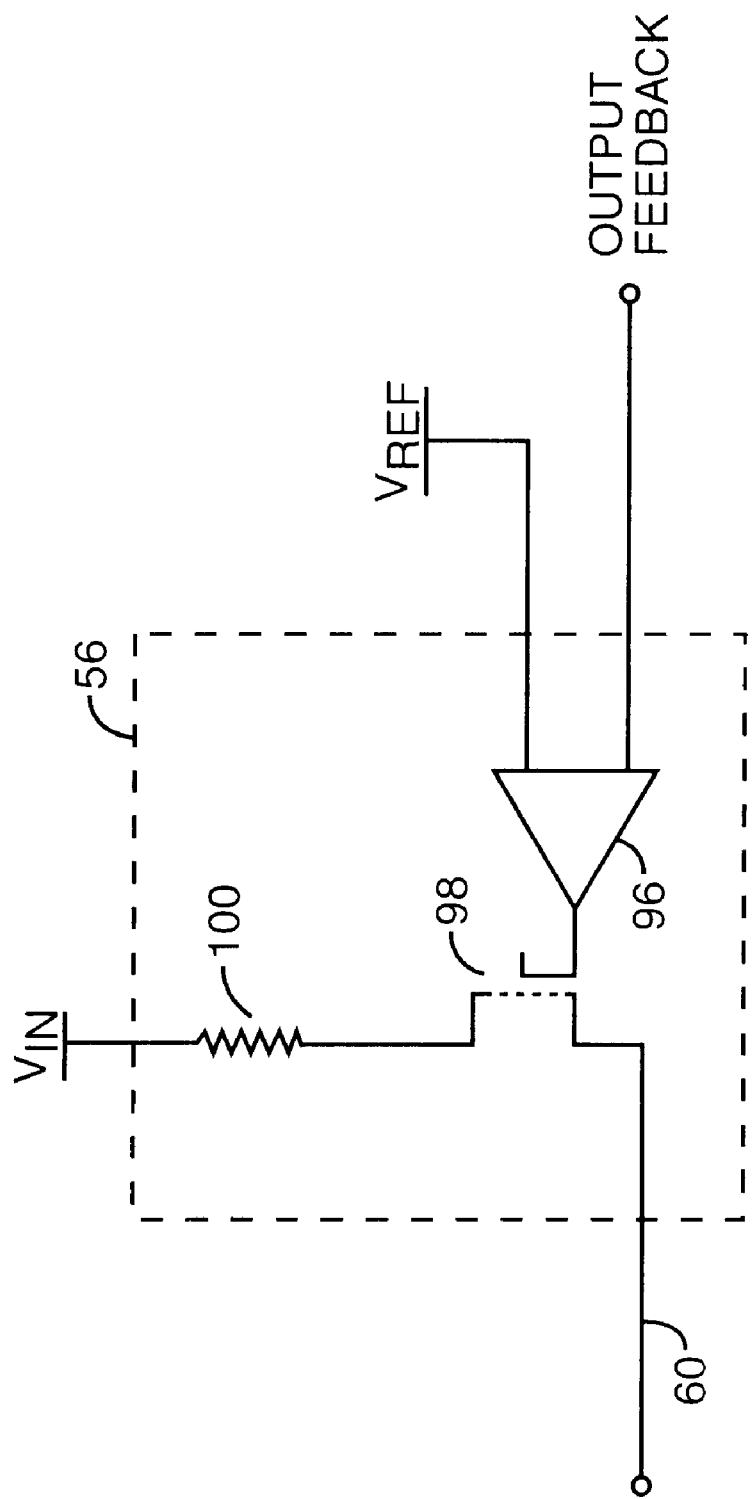
FIG. 7 is an alternate embodiment of the DC compensation circuit of FIG. 6A.

Other variations are possible, and FIG. 7 depicts an analog version of the DC correction circuit 56. A low bandwidth amplifier 96 controls a FET 98 such that it draws a controlled current through a resistor 100 from a voltage source, such as the supply voltage $V_{IN}$. Note that the circuit of FIG. 7 may further comprise additional filtering, such as might be applied to the $V_{IN}$ signal. As those skilled in the art will readily appreciate, any number of circuit variations may be practiced within the virtual ripple generator 46 to combine a controlled ramping signal with actual output feedback.

Figure 8:
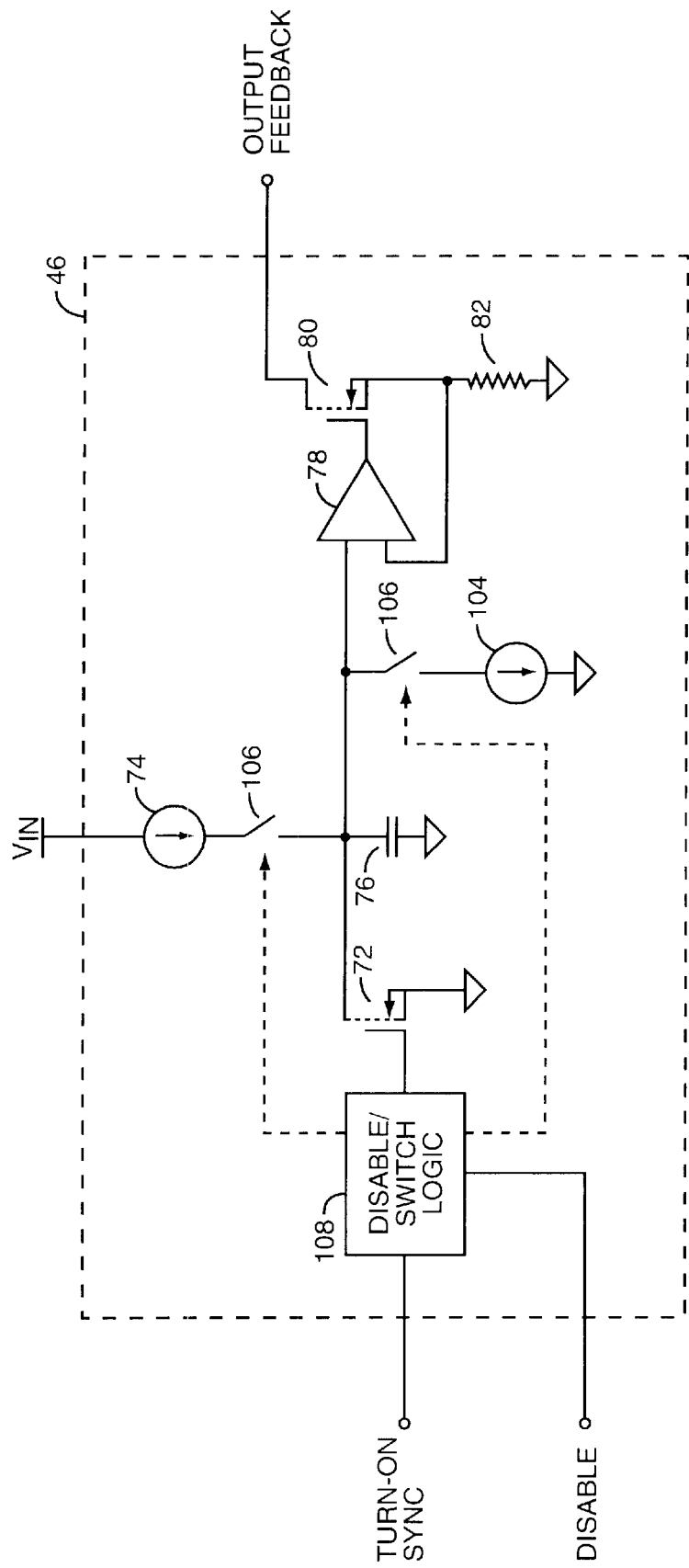
FIG. 8 is an alternate embodiment of the virtual ripple generator of FIG. 3, and is associated with the signal waveforms shown in FIG. 5.

FIG. 8 depicts an exemplary dual slope virtual ripple generator 46 suitable for use in generating the dual-slope $I_{RAMP}$ signal depicted in FIG. 5. The virtual ripple generator 46 is essentially the same as that depicted in FIG. 6A, but includes an additional current source 104 connected to the ramp capacitor 76 via a lower control switch 106. The original current source 74 is connected to the ramp capacitor 76 via an upper control switch 106. The switches 106 may, for example, be FET devices similar to the ramp-enable switch 72. Nominally, the current source 104 has the same magnitude as the current source 74, but this can be altered as needed in a particular design. The disable logic 70 is replaced by disable/switch logic 108. The disable/switch logic 108 provides control for the ramp enable switch 72 as well as the upper and lower control switches 106. If disable features are not included in the virtual ripple generator 46, the disable/switch logic 108 simply provides the appropriate switch control functions.

In operation, the turn-on synchronization signal turns off the ramp enable switch 72. The disable/switch logic 108 closes the upper control switch 106, which allows the current source 74 to charge the ramp capacitor 76. To generate the negative slope, the disable/switch logic 108 opens the upper control switch 106, and closes the lower control switch 106. This action allows the current source 104 to discharge the ramp capacitor 76. Those skilled in the art will readily appreciate the numerous circuit implementations that are available for the generation of a single and dual slope current or voltage waveforms. The present invention contemplates all such variations.

Indeed while the virtual ripple generator 46 is presented in the context of current ramps produced by the ramp generator 54 and compensation currents produced by the DC correction circuit 56, the regulation feedback signal may be generated in any number of circuit implementations, provided such implementations permit combination of a desired artificially generated ripple signal with a representation of the actual output feedback signal, or a signal somehow proportional to the output feedback signal.

Figure 9:
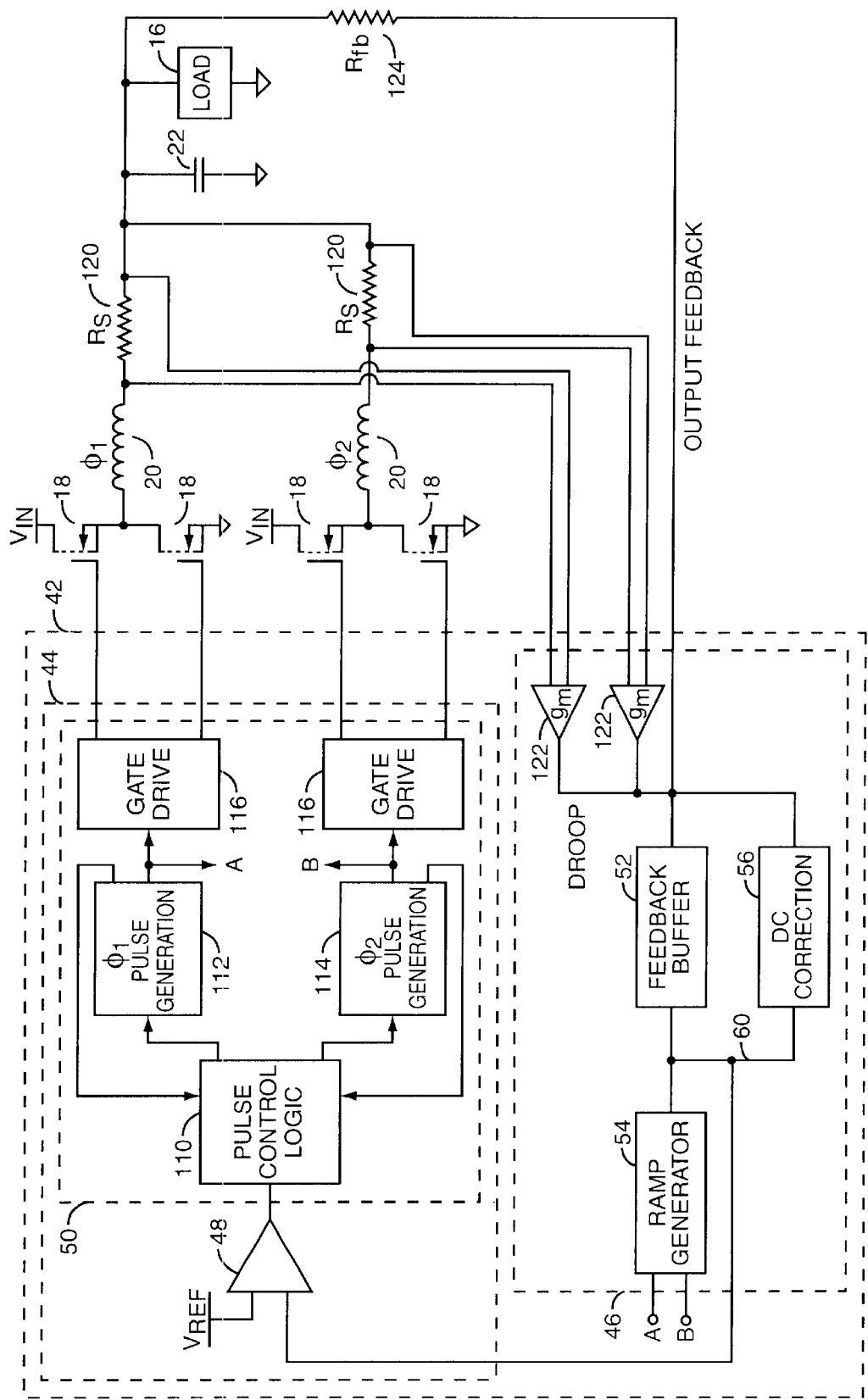
FIG. 9 is an alternate, multiphase embodiment of the voltage regulator of FIG. 2.

FIG. 9 depicts a multi-phase implementation of the virtual ripple generator 46 in the context of a two-phase, constant on-time controller 42. The virtual ripple generator 46 includes the ramp generator 54 as before, but here the ramp generator 54 is responsive to each of the phases of the controller 42. That is, the turn-on synchronization signals associated with switching the multiple phases on and off collectively drive the ramp generator 54, such that it regenerates or restarts its $I_{RAMP}$ signal in response to switching any of the phases.

Switching logic 50 includes pulse control logic 110, phase one pulse generator 112 and associated gate drive 116, and phase two pulse generator 114 and associated gate drive 116. Switching logic 50 controls the output switches 18 to turn phase one and phase two inductors 20 on and off responsive to the output signal from the regulation comparator 48. Note that the phase one and phase two inductors 20 connect to the load 16 through current sensing resistors 120. The virtual ripple generator 46 optionally includes transconductance amplifiers 122 connected across the current sensing resistors 120.

This connection allows each transconductance amplifier 122 to output a current proportional to the voltage drop across the sensor resistor 120 in the respective output phase. In this configuration, the output feedback signal is buffered from the actual load connection via a feedback resistor 124. This allows the current produced by the transconductance amplifiers 122 proportional to the individual phase 1 and 2 load currents to create a proportional voltage on the input of the feedback buffer 52 and the DC correction circuit 56.

By increasing the apparent output feedback voltage in proportion to the load current, the controller 42 can implement output voltage droop, wherein the set point of its regulated voltage is intentionally depressed somewhat below the nominal regulation point under high current conditions into the load 16, to help control output voltage over shoot when the high current condition is relieved.

While FIG. 9 depicts a two-phase constant on time controller, the virtual ripple generator 46 can be configured to work with any type of controller 42 that bases regulation control on a ripple signal synchronized to its output switching operations, and can be configured to accommodate any number of output phases. Note that in multiphase applications, the turn-on synchronization signals provided to the ramp generator 54 should be controlled to ensure that multiple output phases are not simultaneously turned on. The disable/switch control logic 108 shown in FIG. 8 for the ramp generator 54 could, if desired, be adapted to block simultaneously asserted synchronization signals.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A ripple generating circuit for a ripple-mode switching voltage regulator, the ripple generating circuit comprising:
   a buffer connected to an output of the voltage regulator providing a feedback signal as a buffered version of a regulated output signal of the voltage regulator; and
   a ramp generator to impart an arbitrary-magnitude ripple signal in the feedback signal that is synchronized to a switching cycle of the voltage regulator.

2. The circuit of claim 1 further comprising a DC compensator to compensate the feedback signal for undesired voltage offset in the feedback signal caused by the ramp generator.

3. The circuit of claim 2 wherein the ripple signal is based on the ramp generator sinking a ramp current from the feedback signal, which tends to decrease a signal level of the feedback signal, and further wherein the DC compensator outputs a compensation current proportional to a characteristic of the ramp current to substantially prevent the undesired voltage offset in the feedback signal.

4. The circuit of claim 3 wherein the characteristic of the ramp current is an average current value, and wherein the DC compensator generates the compensation current in proportion to the average current value.

5. The circuit of claim 4 wherein the DC compensator is adapted to output the compensation current at a value that is substantially equal to the ramp current at instants of time substantially coincident with on-switching of at least one switched output phase associated with the voltage regulator.

6. The circuit of claim 2 wherein the DC compensator comprises a low-bandwidth amplifier adapted to provide a compensation signal proportional to a difference between the regulated output signal and a reference signal.

7. The circuit of claim 2 wherein the DC compensator is a low-bandwidth analog amplifier adapted to have a bandwidth significantly lower than a switching frequency of the voltage regulator.

8. The circuit of claim 2 wherein the DC compensator is a low-bandwidth amplifier comprising:
- an offset comparator adapted to output a high/low signal by comparing the regulated output signal to a reference signal;
- a counter adapted to output a count value responsive to the high/low signal; and
- a digital-to-analog converter adapted to output a compensation signal proportionate to the count value provided by the counter.

9. The circuit of claim 8 wherein the counter is gated such that the high/low signal is latched once per switching cycle of the voltage regulator.

10. The circuit of claim 8 wherein a maximum count value of the counter determines a bandwidth of the low-bandwidth amplifier.

11. The circuit of claim 1 wherein the voltage regulator provides a plurality of output phases, each providing a phase output signal, wherein the phase output signals are combined to form the regulated output signal, and wherein the ramp generator comprises a corresponding plurality of ramp generators, each ramp generator synchronized to a respective one of the plurality of output phases.

12. The circuit of claim 11 further comprising a synchronization logic circuit adapted to receive ramp start signals for initiating the plurality of ramp generators synchronously with respective ones of the plurality of output phases.

13. The circuit of claim 12 wherein the synchronization logic circuit is further adapted to prevent more than one of the plurality of ramp generators from being initiated simultaneously.

14. The circuit of claim 1 further comprising a shut-down circuit responsive to a disable signal and adapted to disable operation of the ramp generator.

15. The circuit of claim 14 wherein the shut-down circuit further comprises a bypass switch adapted to provide the regulated output signal of the voltage regulator as the feedback signal when the disable signal is asserted.

16. The circuit of claim 1 wherein the ramp generator comprises:
- a ramp circuit adapted to generate an arbitrary ramping voltage responsive to a ramp start signal synchronized to the switching cycle of the voltage regulator; and
- an output circuit adapted to sink a ramp current proportional to the ramping voltage to impress the ripple signal in the feedback signal.

17. The circuit of claim 16 wherein the ramp circuit is further adapted to disable the ramp generator responsive to a disable signal.

18. The circuit of claim 16 wherein the ramp circuit includes a ramp adjustment input to control at least one characteristic of the ripple signal imparted to the feedback signal.

19. The circuit of claim 18 wherein the ramp adjustment input is adapted to connect with an external capacitor, such that a capacitance value of the external capacitor controls a magnitude of the ripple signal.

20. The circuit of claim 18 wherein the ramp adjustment input is adapted to connect with an external resistor, such that a resistance value of the external resistor controls a magnitude of the ripple signal.

21. The circuit of claim 16 wherein the ramp circuit generates the ripple signal as a single-slope waveform in a first configuration and generates the ripple signal as a dual-slope waveform in a second configuration, said first configuration corresponding to use of the circuit with a constant on-time controller as the voltage regulator and said second configuration corresponding to use of the circuit with a hysteretic controller as the voltage regulator.

22. The circuit of claim 1 wherein the buffer comprises a voltage follower circuit.

23. The circuit of claim 1 further comprising a droop compensator adapted to impart a voltage offset in the feedback signal that is proportional to a current of the regulated output signal, thereby imparting output voltage droop compensation to the voltage regulator.

24. The circuit of claim 23 wherein an input of the buffer is coupled to the regulated output signal through a series impedance, and further wherein the droop compensator comprises an amplifier adapted to inject a droop current proportional to the current of the regulated output signal into a node connecting the series impedance with the buffer.

25. The circuit of claim 1 wherein the ripple generating circuit comprises an integrated portion of the voltage regulator.

26. The circuit of claim 1 further comprising a coupling capacitor to couple said ramp generator to an output of said buffer.

27. The circuit of claim 26 wherein said ramp generator comprises:
- a ramp circuit to generate a ramping voltage signal; and
- a follower amplifier to generate said ripple signal as a voltage ripple signal, wherein said voltage ripple signal is coupled through said coupling capacitor to said feedback signal.

28. The circuit of claim 27 wherein said ramp circuit comprises:
- a current source to generate a charging current; and
- a ramp capacitor to develop said ramping voltage signal based on said charging current.

29. The circuit of claim 26 wherein said buffer comprises:
- a buffer amplifier configured as a voltage follower to generate said feedback signal based on buffering said regulated output signal; and
- a resistor coupling an output of said buffer amplifier in series to said coupling capacitor.

30. A voltage regulator configured to provide a regulated output signal at a desired voltage, the voltage regulator comprising:
- a regulation comparator adapted to generate a switching signal by comparing a regulation feedback signal to a reference signal;
- a switching logic circuit adapted to control on/off switching of at least one switched output circuit associated with the voltage regulator responsive to the switching signal to control a voltage of the regulated output signal; and
- a virtual ripple generator adapted to generate the regulation feedback signal as a composite signal comprising a buffered version of the regulated output signal and a virtual ripple component with an arbitrary ripple magnitude that is synchronized with a switching cycle of the voltage regulator.

31. The voltage regulator of claim 30 wherein the virtual ripple generator comprises:
- a buffer circuit adapted to provide the buffered version of the regulated output signal; and
- at least one ramp generator to generate a virtual ripple signal of an arbitrary magnitude for imparting the virtual ripple component to the buffered version of the regulated output signal, thereby forming the regulation feedback signal.

32. The voltage regulator of claim 31 wherein the virtual ripple generator further comprises a DC compensator adapted to compensate the regulation feedback signal for an undesired voltage offset in the regulated output signal otherwise caused by the at least one ramp generator.

33. The voltage regulator of claim 32 wherein the virtual ripple signal is based on the at least one ramp generator sinking ramp current from the regulation feedback signal, which decrease a signal level of the regulation feedback signal, and further wherein the DC compensator outputs a compensation current proportional to a characteristic of the ramp current, thereby substantially preventing the decrease in the signal level of the regulation feedback signal from causing the undesired voltage in the regulated output signal.

34. The voltage regulator of claim 33 wherein the characteristic of the ramp current is an average current value, and wherein the DC compensator generates the compensation current in proportion to the average current value.

35. The voltage regulator of claim 33 wherein the DC compensator is adapted to output the compensation current at a value that is substantially equal to the ramp current at instants of time substantially coincident with the turn-on transitions in the switching cycle of the voltage regulator.

36. The voltage regulator of claim 32 wherein the DC compensator comprises a low-bandwidth amplifier adapted to provide a compensation signal proportional to a difference between the regulated output signal and a reference signal.

37. The voltage regulator of claim 32 wherein the DC compensator is a low-bandwidth analog amplifier adapted to have a bandwidth significantly lower than a switching frequency of the voltage regulator.

38. The voltage regulator of claim 32 wherein the DC compensator is a low-bandwidth amplifier comprising:
an offset comparator adapted to output a high/low signal by comparing the regulated output signal to a reference signal;
a counter adapted to output a count value responsive to the high/low signal; and
a digital-to-analog converter adapted to output a compensating signal proportionate to the count value provided by the counter.

39. The voltage regulator of claim 38 wherein the counter is gated such that the high/low signal is latched once per switching cycle of the voltage regulator.

40. The voltage regulator of claim 38 wherein a maximum count value of the counter determines a bandwidth of the low-bandwidth amplifier.

41. The voltage regulator of claim 30 wherein the voltage regulator provides a plurality of switched output phases, each providing a phase output signal, wherein the phase output signals are combined to form the regulated output signal, and wherein the at least one ramp generator comprises a corresponding plurality of ramp generators, each ramp generator synchronized to a respective one of the plurality of switched output phases.

42. The voltage regulator of claim 41 further comprising a synchronization logic circuit adapted to receive ramp start signals for initiating the plurality of ramp generators synchronously with respective ones of the plurality of switched output phases.

43. The voltage regulator of claim 42 wherein the synchronization logic circuit is further adapted to prevent more than one of the plurality of ramp generators from being initiated simultaneously.

44. The voltage regulator of claim 30 further comprising a shut-down circuit responsive to a disable signal and adapted to disable operation of the virtual ripple generator.

45. The voltage regulator of claim 44 wherein the shut-down circuit further comprises a bypass switch adapted to provide the regulated output signal as the regulation feedback signal when the virtual ripple generator is disabled.

46. The voltage regulator of claim 30 wherein the virtual ripple generator comprises:
a buffer to generate a buffered version of the regulated output signal as the regulation feedback signal;
a ramp circuit adapted to generate a ramping voltage responsive to a ramp start signal synchronized to the switching cycle of the voltage regulator; and
an output circuit adapted to sink a ramp current proportional to the ramping voltage from the regulation feedback signal to impart the virtual ripple component in the regulation feedback signal.

47. The voltage regulator of claim 46 wherein the virtual ripple generator is further adapted to disable the ramp circuit responsive to a disable signal.

48. The voltage regulator of claim 46 wherein the ramp circuit includes a ramp adjustment input adapted to control the arbitrary magnitude of the virtual ripple component.

49. The voltage regulator of claim 30 further comprising a droop compensator adapted to impart a voltage offset in the regulation feedback signal that is proportional to a current of the regulated output signal, thereby imparting output voltage droop compensation to the voltage regulator via the virtual ripple generator.

50. The voltage regulator of claim 49 wherein the droop compensator comprises an amplifier adapted to provide a droop current proportional to the current of the regulated output signal.

51. The voltage regulator of claim 30 wherein said virtual ripple generator comprises:
a buffer connected to an output of the voltage regulator, said buffer providing the regulation feedback signal as a buffered version of the regulated output signal; and
a ramp generator to impart the ripple component to the regulation feedback signal.

52. The voltage regulator of claim 51 wherein said buffer comprises:
a voltage follower amplifier to generate the regulation feedback signal as a buffered version of the regulated output signal; and
a resistor placed in series with an output of said voltage follower amplifier to provide a controlled source resistance for said buffer.

53. The voltage regulator of claim 52 wherein said ramp generator comprises:
a ramp circuit to generate a ramping voltage signal;
a follower amplifier to generate said ripple component as a voltage ripple signal; and
a coupling capacitor to couple said voltage ripple signal to said regulation feedback signal provided by said buffer.

54. The voltage regulator of claim 53 wherein said ramp circuit comprises:
a current source to generate an arbitrary charging current; and
a ramp capacitor to develop said ramping voltage signal based on said charging current.

55. A method of generating a virtual ripple signal for use in ripple-mode voltage regulation, the method comprising:
generating a regulator feedback signal by buffering a regulated output signal of a ripple-mode voltage regulator; and imparting a ripple signal of an arbitrary magnitude to the regulator feedback signal that is synchronized with a switching cycle of the voltage regulator.

56. The method of claim 55 wherein imparting a ripple signal of an arbitrary magnitude to the regulator feedback signal that is synchronized with the switching cycle of the voltage regulator comprises:

generating a ramp signal initiated synchronously with the switching cycle of the voltage regulator; and adjusting the regulator feedback signal in proportion to the ramp signal, thereby imparting the ripple signal to the regulator feedback signal.

57. The method of claim 56 wherein generating a ramp signal initiated synchronously with the switching cycle of the voltage regulator comprises generating a ramping current, and further wherein adjusting the regulator feedback signal in proportion to the ramp signal comprises sourcing the ramping current from the regulator feedback signal through a known impedance to impart the ripple signal to the regulator feedback signal.

58. The method of claim 55 wherein generating a regulator feedback signal responsive to a regulated output signal of a voltage regulator comprises buffering the regulated output signal of the switch-mode voltage regulator to form a buffered version of the regulated output signal, and then imparting the ripple signal to the buffered version of the regulated output signal.

59. The method of claim 55 wherein the regulated output signal of the voltage regulator is a composite of a plurality of output signals provided by a plurality of output phases of the voltage regulator, and further comprising generating a ramp current for each one of the plurality of output phases, each ramp current synchronized to a respective one of the output phases, wherein the ramp currents form the ripple signal and are operative to impart ripple to the regulator feedback signal.

60. The method of claim 59 further comprising controlling ramp current initiation signals that synchronize each ramp current with the respective one of the plurality of output phases such that no more than one of the ramp currents is initiated at a time.

61. The method of claim 55 wherein imparting a ripple signal of an arbitrary magnitude to the regulator feedback signal that is synchronized with a switching cycle of the voltage regulator causes an undesirable voltage offset in the regulator output signal, and further comprising compensating the regulator feedback signal to substantially prevent the undesirable offset voltage.

62. The method of claim 61 wherein compensating the regulator feedback signal to substantially prevent the undesirable voltage offset comprises combining a compensation signal with the regulator feedback signal that is substantially equal to an average value of the ripple signal.

63. The method of claim 61 wherein compensating the regulator feedback signal to substantially prevent the undesirable voltage offset comprises adding a compensation signal proportionate to a characteristic of the ripple signal to the regulator feedback signal.

64. The method of claim 61 wherein the ripple signal comprises at least one current ramp signal operative to pull down a voltage level of the regulator feedback signal thereby imparting the ripple signal, and further wherein the compensation signal is a compensation current substantially equal to the at least one current ramp signal at instants of time substantially coincident with turn-on times in the switching cycle of the voltage regulator.

65. The method of claim 55 further comprising:

sensing an output current of the regulated output signal; and imparting a droop offset proportional to the output current to the regulator feedback signal to cause the voltage regulator to implement voltage droop in the regulated output signal as a function of the output current.

66. The method of claim 55 wherein imparting a ripple signal of an arbitrary magnitude synchronized with a switching cycle of the switch-mode voltage regulator to the regulator feedback signal comprises:

generating a ramping signal of an arbitrary magnitude; and

AC coupling said ramping signal to the regulator feedback signal to impress said ripple signal in said regulator feedback signal.

* * * * *